US010348756B2

(12) United States Patent
Oberheide et al.

(10) Patent No.: US 10,348,756 B2
(45) Date of Patent: *Jul. 9, 2019

(54) SYSTEM AND METHOD FOR ASSESSING VULNERABILITY OF A MOBILE DEVICE

(71) Applicant: Duo Security, Inc., Ann Arbor, MI (US)

(72) Inventors: Jon Oberheide, Ann Arbor, MI (US); Dug Song, Ann Arbor, MI (US); Adam Goodman, Bloomfield Hills, MI (US)

(73) Assignee: Duo Security, Inc., Ann Arbor, MI (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/259,457

(22) Filed: Sep. 8, 2016

(65) Prior Publication Data

US 2016/0381063 A1    Dec. 29, 2016

Related U.S. Application Data

(63) Continuation of application No. 13/601,409, filed on Aug. 31, 2012, now Pat. No. 9,467,463.

(60) Provisional application No. 61/530,560, filed on Sep. 2, 2011.

(51) Int. Cl.
*H04L 29/06* (2006.01)
*H04W 12/12* (2009.01)

(52) U.S. Cl.
CPC ......... *H04L 63/1433* (2013.01); *H04W 12/12* (2013.01)

(58) Field of Classification Search
None
See application file for complete search history.

(56) References Cited

U.S. PATENT DOCUMENTS

| 5,754,763 | A | 5/1998 | Bereiter |
| 5,838,792 | A | 11/1998 | Ganesan |
| 5,870,723 | A | 2/1999 | Pare et al. |
| 6,119,096 | A | 9/2000 | Mann et al. |
| 6,209,091 | B1 | 3/2001 | Sudia et al. |
| 6,311,272 | B1 | 10/2001 | Gressel |

(Continued)

FOREIGN PATENT DOCUMENTS

| EP | 2639997 B1 | 9/2014 |
| WO | 2007075850 A2 | 7/2007 |
| WO | 2014150073 A2 | 9/2014 |

OTHER PUBLICATIONS

Edge, Kenneth, et al. "The use of attack and protection trees to analyze security for an online banking system." System Sciences, 2007. HICSS 2007. 40th Annual Hawaii International Conference on. IEEE, 2007.

(Continued)

*Primary Examiner* — Christopher A Revak

(57) ABSTRACT

A system and method for assessing vulnerability of a mobile device including at a remote analysis cloud service, receiving at least one vulnerability assessment request that includes an object identifier for an operative object of a mobile computing device, wherein the vulnerability assessment request originates from the mobile computing device; identifying a vulnerability assessment associated with the identifier of the operative object; and communicating the identified vulnerability assessment to the mobile computing device.

24 Claims, 6 Drawing Sheets

(56) References Cited

U.S. PATENT DOCUMENTS

| | | | |
|---|---|---|---|
| 6,662,205 B1 | 12/2003 | Bereiter |
| 6,694,025 B1 | 2/2004 | Epstein et al. |
| 6,758,394 B2 | 7/2004 | Maskatiya et al. |
| 6,823,359 B1 | 11/2004 | Heidingsfeld et al. |
| 6,934,858 B2 | 8/2005 | Woodhill |
| 6,956,950 B2 | 10/2005 | Kausik |
| 6,996,716 B1 | 2/2006 | Hsu |
| 7,000,247 B2 | 2/2006 | Banzhof |
| 7,093,133 B2 | 8/2006 | Hopkins et al. |
| 7,096,354 B2 | 8/2006 | Wheeler et al. |
| 7,107,246 B2 | 9/2006 | Wang |
| 7,146,009 B2 | 12/2006 | Andivahis et al. |
| 7,172,115 B2 | 2/2007 | Lauden |
| 7,213,260 B2 | 5/2007 | Judge |
| 7,331,518 B2 | 2/2008 | Rable |
| 7,334,255 B2 | 2/2008 | Lin et al. |
| 7,340,600 B1 | 3/2008 | Corella |
| 7,386,720 B2 | 6/2008 | Sandhu et al. |
| 7,447,784 B2 | 11/2008 | Eun |
| 7,463,637 B2 | 12/2008 | Bou-Diab et al. |
| 7,483,384 B2 | 1/2009 | Bryant et al. |
| 7,496,662 B1 | 2/2009 | Roesch et al. |
| 7,526,792 B2 | 4/2009 | Ross |
| 7,562,382 B2 | 7/2009 | Hinton et al. |
| 7,562,385 B2 | 7/2009 | Thione et al. |
| 7,571,471 B2 | 8/2009 | Sandhu et al. |
| 7,574,733 B2 | 8/2009 | Woodhill |
| 7,599,493 B2 | 10/2009 | Sandhu et al. |
| 7,630,493 B2 | 12/2009 | Sandhu et al. |
| 7,711,122 B2 | 5/2010 | Allen et al. |
| 7,712,137 B2 * | 5/2010 | Meier ................ H04L 63/1433 713/152 |
| 7,716,240 B2 | 5/2010 | Lim |
| 7,733,803 B2 | 6/2010 | Vogel et al. |
| 7,764,970 B2 | 7/2010 | Neil et al. |
| 7,793,110 B2 | 9/2010 | Durfee et al. |
| 7,836,501 B2 | 11/2010 | Sobel et al. |
| 7,904,608 B2 | 3/2011 | Price |
| 7,953,979 B2 | 5/2011 | Borneman et al. |
| 7,958,362 B2 | 6/2011 | Hwang |
| 7,961,645 B2 | 6/2011 | Gudipudi et al. |
| 7,982,595 B2 | 7/2011 | Hanna et al. |
| 7,983,987 B2 | 7/2011 | Kranzley et al. |
| 8,001,610 B1 | 8/2011 | Chickering et al. |
| 8,010,779 B2 | 8/2011 | Sermersheim et al. |
| 8,028,329 B2 | 9/2011 | Whitcomb |
| 8,099,368 B2 | 1/2012 | Coulter et al. |
| 8,108,933 B2 * | 1/2012 | Mahaffey ............ G06F 21/564 709/203 |
| 8,136,148 B1 | 3/2012 | Chayanam et al. |
| 8,141,146 B2 | 3/2012 | Ozeki |
| 8,151,333 B2 | 4/2012 | Zhu et al. |
| 8,161,527 B2 | 4/2012 | Curren |
| 8,181,253 B1 | 5/2012 | Zaitsev et al. |
| 8,185,740 B2 | 5/2012 | Choe et al. |
| 8,185,744 B2 | 5/2012 | Brown et al. |
| 8,185,962 B2 | 5/2012 | Moore |
| 8,200,980 B1 | 6/2012 | Robinson et al. |
| 8,225,392 B2 | 7/2012 | Dubrovsky et al. |
| 8,245,044 B2 | 8/2012 | Kang |
| 8,250,478 B2 | 8/2012 | Dharmarajan et al. |
| 8,259,947 B2 | 9/2012 | Gantman et al. |
| 8,281,401 B2 | 10/2012 | Pennington et al. |
| 8,281,403 B1 | 10/2012 | Asheghian et al. |
| 8,321,437 B2 | 11/2012 | Lim |
| 8,332,627 B1 | 12/2012 | Matthews et al. |
| 8,335,933 B2 | 12/2012 | Humphrey et al. |
| 8,340,287 B2 | 12/2012 | Sandhu et al. |
| 8,340,635 B2 | 12/2012 | Herz et al. |
| 8,380,192 B2 | 2/2013 | Kim et al. |
| 8,381,297 B2 | 2/2013 | Touboul |
| 8,397,212 B2 | 3/2013 | Chijiiwa |
| 8,397,301 B2 | 3/2013 | Hering et al. |
| 8,397,302 B2 | 3/2013 | Mont et al. |
| 8,402,526 B2 | 3/2013 | Ahn |
| 8,418,168 B2 | 4/2013 | Tyhurst et al. |
| 8,458,308 B1 | 6/2013 | Steves |
| 8,458,798 B2 | 6/2013 | Williams et al. |
| 8,484,708 B2 | 7/2013 | Chern |
| 8,495,720 B2 | 7/2013 | Counterman |
| 8,499,149 B2 | 7/2013 | Chen |
| 8,499,339 B2 | 7/2013 | Chao et al. |
| 8,510,820 B2 | 8/2013 | Oberheide et al. |
| 8,522,010 B2 | 8/2013 | Ozzie et al. |
| 8,528,039 B2 | 9/2013 | Chakarapani |
| 8,533,844 B2 * | 9/2013 | Mahaffey ............ G06F 21/564 709/203 |
| 8,538,028 B2 | 9/2013 | Yeap et al. |
| 8,539,544 B2 | 9/2013 | Srinivasan et al. |
| 8,539,567 B1 | 9/2013 | Luxemberg et al. |
| 8,548,426 B2 | 10/2013 | Smith |
| 8,549,601 B2 | 10/2013 | Ganesan |
| 8,571,220 B2 | 10/2013 | Ollikainen et al. |
| 8,578,162 B2 | 11/2013 | Jentzsch et al. |
| 8,588,422 B2 | 11/2013 | Beachem et al. |
| 8,595,809 B2 | 11/2013 | Chayanam et al. |
| 8,595,822 B2 | 11/2013 | Schrecker et al. |
| 8,601,554 B2 | 12/2013 | Gordon et al. |
| 8,612,305 B2 | 12/2013 | Dominguez et al. |
| 8,627,438 B1 | 1/2014 | Bhimanaik |
| 8,646,060 B1 | 2/2014 | Ayed |
| 8,646,086 B2 | 2/2014 | Chakra et al. |
| 8,667,288 B2 | 3/2014 | Yavuz |
| 8,689,287 B2 | 4/2014 | Bohmer et al. |
| 8,700,729 B2 | 4/2014 | Dua |
| 8,707,365 B2 | 4/2014 | Corl |
| 8,707,384 B2 | 4/2014 | Jain et al. |
| 8,713,329 B2 | 4/2014 | Schneider |
| 8,713,639 B2 | 4/2014 | Cheeniyil et al. |
| 8,719,930 B2 | 5/2014 | Lapsley et al. |
| 8,732,475 B2 | 5/2014 | Fahrny et al. |
| 8,732,839 B2 | 5/2014 | Hohl |
| 8,737,623 B2 | 5/2014 | Hart |
| 8,745,703 B2 | 6/2014 | Lambert et al. |
| 8,751,801 B2 | 6/2014 | Harris et al. |
| 8,756,651 B2 | 6/2014 | Baer et al. |
| 8,756,698 B2 | 6/2014 | Sidagni |
| 8,763,077 B2 | 6/2014 | Oberheide et al. |
| 8,789,178 B2 | 7/2014 | Kejriwal et al. |
| 8,806,609 B2 | 8/2014 | Gladstone et al. |
| 8,806,638 B1 | 8/2014 | Mani |
| 8,813,228 B2 | 8/2014 | Magee et al. |
| 8,838,759 B1 | 9/2014 | Eatough et al. |
| 8,850,017 B2 | 9/2014 | Ebrahimi et al. |
| 8,850,516 B1 | 9/2014 | Hrebicek et al. |
| 8,850,530 B2 | 9/2014 | Shahbazi |
| 8,862,097 B2 | 10/2014 | Brand et al. |
| 8,891,772 B2 | 11/2014 | D Souza et al. |
| 8,893,230 B2 | 11/2014 | Oberheide et al. |
| 8,898,762 B2 | 11/2014 | Kang |
| 8,903,365 B2 | 12/2014 | Stricklen et al. |
| 8,910,268 B2 | 12/2014 | Hudis et al. |
| 8,935,769 B2 | 1/2015 | Hessler |
| 8,938,531 B1 * | 1/2015 | Cotton ................ H04L 63/1433 709/224 |
| 8,938,799 B2 | 1/2015 | Kuo |
| 8,949,596 B2 | 2/2015 | Yin et al. |
| 8,949,927 B2 | 2/2015 | Arnott et al. |
| 8,955,038 B2 | 2/2015 | Nicodemus et al. |
| 8,955,075 B2 | 2/2015 | Von Bokern et al. |
| 8,959,568 B2 | 2/2015 | Hudis et al. |
| 8,966,587 B2 | 2/2015 | Nair et al. |
| 8,984,276 B2 | 3/2015 | Benson et al. |
| 9,037,127 B2 | 5/2015 | Raleigh |
| 9,043,886 B2 | 5/2015 | Srinivasan et al. |
| 9,049,011 B1 | 6/2015 | Agrawal |
| 9,049,594 B2 | 6/2015 | Chen et al. |
| 9,071,611 B2 | 6/2015 | Yadav et al. |
| 9,076,343 B2 | 7/2015 | Chaar et al. |
| 9,077,758 B1 | 7/2015 | McGovern et al. |
| 9,110,754 B2 | 8/2015 | Poonamalli et al. |
| 9,118,656 B2 | 8/2015 | Ting et al. |
| 9,122,888 B2 | 9/2015 | Devi |
| 9,124,582 B2 | 9/2015 | Kalinichenko et al. |

(56) References Cited

U.S. PATENT DOCUMENTS

| | | |
|---|---|---|
| 9,135,458 B1 | 9/2015 | Hankins et al. |
| 9,154,387 B2 | 10/2015 | Maki et al. |
| 9,172,545 B2 | 10/2015 | Edstrom et al. |
| 9,189,491 B2 | 11/2015 | Fushman et al. |
| 9,201,644 B2 | 12/2015 | Klein et al. |
| 9,203,841 B2 | 12/2015 | Neuman et al. |
| 9,210,044 B2 | 12/2015 | Kacin et al. |
| 9,215,234 B2 | 12/2015 | Black |
| 9,223,961 B1 | 12/2015 | Sokolov |
| 9,225,840 B2 | 12/2015 | Malatack et al. |
| 9,253,185 B2 | 2/2016 | Alaranta et al. |
| 9,258,296 B2 | 2/2016 | Juthani |
| 9,264,443 B2 | 2/2016 | Weisman |
| 9,270,674 B2 | 2/2016 | Lang et al. |
| 9,282,085 B2 | 3/2016 | Oberheide et al. |
| 9,338,156 B2 | 5/2016 | Oberheide et al. |
| 9,338,163 B2 | 5/2016 | Wendling et al. |
| 9,338,176 B2 | 5/2016 | Trumbull et al. |
| 9,344,275 B2 | 5/2016 | Bar-El et al. |
| 9,349,000 B2 | 5/2016 | Du et al. |
| 9,374,654 B2 | 6/2016 | Lindeman et al. |
| 9,386,003 B2 | 7/2016 | Kumar |
| 9,391,980 B1 | 7/2016 | Krahn et al. |
| 9,397,892 B2 | 7/2016 | Kirner et al. |
| 9,411,963 B2 | 8/2016 | Robke et al. |
| 9,430,938 B2 | 8/2016 | Proud |
| 9,443,073 B2 | 9/2016 | Oberheide et al. |
| 9,443,084 B2 | 9/2016 | Nice et al. |
| 9,454,365 B2 | 9/2016 | Oberheide et al. |
| 9,467,463 B2 * | 10/2016 | Oberheide ............ H04W 12/12 |
| 9,479,509 B2 | 10/2016 | Zeuthen |
| 9,491,189 B2 | 11/2016 | Zeitlin et al. |
| 9,501,315 B2 | 11/2016 | Desai et al. |
| 9,544,143 B2 | 1/2017 | Oberheide et al. |
| 9,607,155 B2 * | 3/2017 | Beresnevichiene ... G06F 21/577 |
| 9,619,307 B2 | 4/2017 | Maltese et al. |
| 9,635,041 B1 | 4/2017 | Warman et al. |
| 9,659,160 B2 | 5/2017 | Ligatti et al. |
| 9,668,137 B2 | 5/2017 | Sigurdson et al. |
| 9,680,864 B2 | 6/2017 | Khesin |
| 9,706,410 B2 | 7/2017 | Sreenivas et al. |
| 9,723,019 B1 | 8/2017 | Rathor |
| 9,754,097 B2 | 9/2017 | Hessler |
| 9,762,429 B2 | 9/2017 | Elmaliah |
| 9,769,538 B2 | 9/2017 | Killick |
| 9,832,221 B1 | 11/2017 | Newstadt et al. |
| 9,918,226 B2 | 3/2018 | Khan |
| 9,940,119 B2 | 4/2018 | Brownell et al. |
| 9,996,343 B2 | 6/2018 | Oberheide et al. |
| 2002/0013898 A1 | 1/2002 | Sudia et al. |
| 2002/0091745 A1 | 7/2002 | Ramamurthy et al. |
| 2002/0123967 A1 | 9/2002 | Wang |
| 2002/0131404 A1 | 9/2002 | Mehta et al. |
| 2002/0136410 A1 | 9/2002 | Hanna |
| 2003/0011545 A1 | 1/2003 | Sagano et al. |
| 2003/0012093 A1 | 1/2003 | Tada et al. |
| 2003/0061506 A1 | 3/2003 | Cooper et al. |
| 2003/0115452 A1 | 6/2003 | Sandhu et al. |
| 2003/0120931 A1 | 6/2003 | Hopkins et al. |
| 2003/0126472 A1 | 7/2003 | Banzhof |
| 2003/0147536 A1 | 8/2003 | Andivahis et al. |
| 2003/0149781 A1 | 8/2003 | Yared et al. |
| 2003/0172291 A1 | 9/2003 | Judge et al. |
| 2004/0064706 A1 | 4/2004 | Lin et al. |
| 2004/0139318 A1 | 7/2004 | Fiala et al. |
| 2004/0187018 A1 | 9/2004 | Owen et al. |
| 2004/0215672 A1 | 10/2004 | Pfitzner |
| 2004/0218763 A1 | 11/2004 | Gantman et al. |
| 2005/0024052 A1 | 2/2005 | Bendall et al. |
| 2005/0097350 A1 | 5/2005 | Patrick et al. |
| 2005/0097352 A1 | 5/2005 | Patrick et al. |
| 2005/0218215 A1 | 10/2005 | Lauden |
| 2005/0221268 A1 | 10/2005 | Chaar et al. |
| 2005/0240522 A1 | 10/2005 | Kranzley et al. |
| 2005/0268107 A1 | 12/2005 | Harris et al. |
| 2005/0278777 A1 | 12/2005 | Loza |
| 2006/0021018 A1 | 1/2006 | Hinton et al. |
| 2006/0024269 A1 | 2/2006 | Doyle et al. |
| 2006/0026304 A1 | 2/2006 | Price |
| 2006/0031938 A1 | 2/2006 | Choi |
| 2006/0059569 A1 | 3/2006 | Dasgupta et al. |
| 2006/0075475 A1 | 4/2006 | Boulos et al. |
| 2006/0101519 A1 | 5/2006 | Lasswell et al. |
| 2006/0130139 A1 | 6/2006 | Sobel et al. |
| 2006/0165060 A1 | 7/2006 | Dua |
| 2006/0182276 A1 | 8/2006 | Sandhu et al. |
| 2006/0184787 A1 | 8/2006 | Sandhu et al. |
| 2006/0184788 A1 | 8/2006 | Sandhu et al. |
| 2006/0195588 A1 | 8/2006 | Pennington et al. |
| 2006/0242692 A1 | 10/2006 | Thione et al. |
| 2007/0016948 A1 | 1/2007 | Dubrovsky et al. |
| 2007/0027961 A1 | 2/2007 | Holzer |
| 2007/0033148 A1 | 2/2007 | Cahill |
| 2007/0081667 A1 | 4/2007 | Hwang |
| 2007/0101145 A1 | 5/2007 | Sachdeva et al. |
| 2007/0143860 A1 | 6/2007 | Hardt |
| 2007/0156592 A1 | 7/2007 | Henderson |
| 2007/0156659 A1 | 7/2007 | Lim |
| 2007/0180490 A1 | 8/2007 | Renzi et al. |
| 2007/0185978 A1 | 8/2007 | Montulli |
| 2007/0186106 A1 | 8/2007 | Ting et al. |
| 2007/0199060 A1 | 8/2007 | Touboul |
| 2007/0204016 A1 | 8/2007 | Kunz et al. |
| 2007/0204346 A1 | 8/2007 | Meier |
| 2007/0228148 A1 | 10/2007 | Rable |
| 2007/0250914 A1 | 10/2007 | Fazal |
| 2007/0254631 A1 | 11/2007 | Spooner |
| 2007/0258594 A1 | 11/2007 | Sandhu et al. |
| 2007/0284429 A1 | 12/2007 | Beeman |
| 2007/0297607 A1 | 12/2007 | Ogura et al. |
| 2008/0004964 A1 | 1/2008 | Messa et al. |
| 2008/0010665 A1 | 1/2008 | Hinton et al. |
| 2008/0012041 A1 | 1/2008 | Kesler |
| 2008/0034413 A1 | 2/2008 | He et al. |
| 2008/0049642 A1 | 2/2008 | Gudipudi et al. |
| 2008/0059804 A1 | 3/2008 | Shah et al. |
| 2008/0069347 A1 | 3/2008 | Brown et al. |
| 2008/0120411 A1 | 5/2008 | Eberle |
| 2008/0134311 A1 | 6/2008 | Medvinsky et al. |
| 2008/0198856 A1 | 8/2008 | Vogel et al. |
| 2008/0201186 A1 | 8/2008 | Poon et al. |
| 2008/0215675 A1 | 9/2008 | Kaminitz et al. |
| 2008/0229104 A1 | 9/2008 | Ju et al. |
| 2008/0301669 A1 | 12/2008 | Rao et al. |
| 2009/0055906 A1 | 2/2009 | Wendorff |
| 2009/0077060 A1 | 3/2009 | Sermersheim et al. |
| 2009/0083225 A1 | 3/2009 | Jacobs et al. |
| 2009/0167489 A1 | 7/2009 | Nan et al. |
| 2009/0177675 A1 | 7/2009 | Trumbull et al. |
| 2009/0187986 A1 | 7/2009 | Ozeki |
| 2009/0198997 A1 | 8/2009 | Yeap et al. |
| 2009/0210705 A1 | 8/2009 | Chen |
| 2009/0254978 A1 | 10/2009 | Rouskov et al. |
| 2009/0259848 A1 | 10/2009 | Williams et al. |
| 2009/0271863 A1 | 10/2009 | Govindavajhala et al. |
| 2009/0300596 A1 | 12/2009 | Tyhurst et al. |
| 2009/0300707 A1 | 12/2009 | Garimella et al. |
| 2009/0328178 A1 | 12/2009 | McDaniel et al. |
| 2010/0002378 A1 | 1/2010 | Chen et al. |
| 2010/0018000 A1 | 1/2010 | Hsu |
| 2010/0023781 A1 | 1/2010 | Nakamoto |
| 2010/0026302 A1 | 2/2010 | Doty et al. |
| 2010/0036931 A1 | 2/2010 | Certain et al. |
| 2010/0042954 A1 | 2/2010 | Rosenblatt et al. |
| 2010/0050263 A1 | 2/2010 | Weisman |
| 2010/0069104 A1 | 3/2010 | Neil et al. |
| 2010/0100725 A1 | 4/2010 | Ozzie et al. |
| 2010/0100924 A1 | 4/2010 | Hinton |
| 2010/0100963 A1 | 4/2010 | Mahaffey |
| 2010/0107225 A1 | 4/2010 | Spencer et al. |
| 2010/0114740 A1 | 5/2010 | Dominguez et al. |
| 2010/0115578 A1 | 5/2010 | Nice et al. |
| 2010/0121767 A1 | 5/2010 | Coulter et al. |
| 2010/0125737 A1 | 5/2010 | Kang |

(56) References Cited

U.S. PATENT DOCUMENTS

| | | |
|---|---|---|
| 2010/0131755 A1 | 5/2010 | Zhu et al. |
| 2010/0180001 A1 | 7/2010 | Hardt |
| 2010/0186082 A1 | 7/2010 | Ladki et al. |
| 2010/0202609 A1 | 8/2010 | Sandhu et al. |
| 2010/0216425 A1 | 8/2010 | Smith |
| 2010/0217986 A1 | 8/2010 | Schneider |
| 2010/0233996 A1 | 9/2010 | Herz et al. |
| 2010/0257610 A1 | 10/2010 | Hohl |
| 2010/0263021 A1 | 10/2010 | Arnott et al. |
| 2010/0263046 A1 | 10/2010 | Polavarapu |
| 2010/0274859 A1 | 10/2010 | Bucuk |
| 2010/0319068 A1 | 12/2010 | Abbadessa et al. |
| 2010/0330969 A1 | 12/2010 | Kim et al. |
| 2011/0026716 A1 | 2/2011 | Tang et al. |
| 2011/0047597 A1 | 2/2011 | Barton et al. |
| 2011/0055903 A1 | 3/2011 | Leggette |
| 2011/0086616 A1 | 4/2011 | Brand et al. |
| 2011/0107389 A1 | 5/2011 | Chakarapani |
| 2011/0113484 A1 | 5/2011 | Zeuthen |
| 2011/0119765 A1 | 5/2011 | Hering et al. |
| 2011/0138469 A1 | 6/2011 | Ye et al. |
| 2011/0145900 A1 | 6/2011 | Chern |
| 2011/0179472 A1 | 7/2011 | Ganesan |
| 2011/0185287 A1 | 7/2011 | Dharmarajan et al. |
| 2011/0185431 A1* | 7/2011 | Deraison ............ H04L 63/1433 726/25 |
| 2011/0197266 A1 | 8/2011 | Chu et al. |
| 2011/0197267 A1 | 8/2011 | Gravel et al. |
| 2011/0219449 A1 | 9/2011 | St. Neitzel et al. |
| 2011/0231265 A1 | 9/2011 | Brown et al. |
| 2011/0277025 A1 | 11/2011 | Counterman |
| 2011/0277034 A1* | 11/2011 | Hanson ................ G06F 21/554 726/25 |
| 2011/0282908 A1* | 11/2011 | Fly ....................... G06F 21/577 707/783 |
| 2011/0289582 A1 | 11/2011 | Kejriwal et al. |
| 2011/0302410 A1 | 12/2011 | Clarke et al. |
| 2011/0302630 A1 | 12/2011 | Nair et al. |
| 2012/0029084 A1 | 2/2012 | Wong |
| 2012/0030093 A1 | 2/2012 | Farias |
| 2012/0060360 A1 | 3/2012 | Liu |
| 2012/0063601 A1 | 3/2012 | Hart |
| 2012/0090028 A1 | 4/2012 | Lapsley et al. |
| 2012/0096274 A1 | 4/2012 | Campagna et al. |
| 2012/0110671 A1 | 5/2012 | Beresnevichiene et al. |
| 2012/0117229 A1 | 5/2012 | Van et al. |
| 2012/0117626 A1 | 5/2012 | Yates et al. |
| 2012/0151567 A1 | 6/2012 | Chayanam et al. |
| 2012/0159600 A1 | 6/2012 | Takagi |
| 2012/0198050 A1 | 8/2012 | Maki et al. |
| 2012/0198228 A1 | 8/2012 | Oberheide et al. |
| 2012/0216239 A1 | 8/2012 | Yadav et al. |
| 2012/0227098 A1 | 9/2012 | Obasanjo et al. |
| 2012/0254957 A1 | 10/2012 | Fork et al. |
| 2012/0278454 A1 | 11/2012 | Stewart et al. |
| 2012/0290841 A1 | 11/2012 | Jentzsch |
| 2012/0300931 A1 | 11/2012 | Ollikainen et al. |
| 2012/0317287 A1 | 12/2012 | Amitai et al. |
| 2012/0321086 A1 | 12/2012 | D'Souza et al. |
| 2012/0323950 A1 | 12/2012 | Wilson et al. |
| 2013/0004200 A1 | 1/2013 | Okabe |
| 2013/0007848 A1 | 1/2013 | Chaskar et al. |
| 2013/0008110 A1 | 1/2013 | Rothwell |
| 2013/0012429 A1 | 1/2013 | Eddowes et al. |
| 2013/0017968 A1 | 1/2013 | Gurtner et al. |
| 2013/0024628 A1 | 1/2013 | Benhase et al. |
| 2013/0042002 A1 | 2/2013 | Cheeniyil et al. |
| 2013/0060708 A1 | 3/2013 | Oskolkov et al. |
| 2013/0067538 A1 | 3/2013 | Dharmarajan et al. |
| 2013/0081101 A1 | 3/2013 | Baer et al. |
| 2013/0086210 A1 | 4/2013 | Yiu et al. |
| 2013/0086658 A1 | 4/2013 | Kottahachchi et al. |
| 2013/0091544 A1 | 4/2013 | Oberheide et al. |
| 2013/0097585 A1 | 4/2013 | Jentsch et al. |
| 2013/0110676 A1 | 5/2013 | Kobres |
| 2013/0117826 A1 | 5/2013 | Gordon et al. |
| 2013/0124292 A1 | 5/2013 | Juthani |
| 2013/0125226 A1 | 5/2013 | Shah et al. |
| 2013/0174246 A1 | 7/2013 | Schrecker et al. |
| 2013/0179681 A1 | 7/2013 | Benson et al. |
| 2013/0239167 A1 | 9/2013 | Sreenivas et al. |
| 2013/0239168 A1 | 9/2013 | Sreenivas et al. |
| 2013/0239177 A1 | 9/2013 | Sigurdson et al. |
| 2013/0246281 A1 | 9/2013 | Yamada et al. |
| 2013/0263211 A1 | 10/2013 | Neuman et al. |
| 2013/0276142 A1 | 10/2013 | Peddada |
| 2013/0310006 A1 | 11/2013 | Chen et al. |
| 2013/0311776 A1 | 11/2013 | Besehanic |
| 2013/0326224 A1 | 12/2013 | Yavuz |
| 2013/0326493 A1 | 12/2013 | Poonamalli et al. |
| 2014/0001975 A1 | 1/2014 | Lee et al. |
| 2014/0007238 A1 | 1/2014 | Magee et al. |
| 2014/0019752 A1 | 1/2014 | Yin et al. |
| 2014/0020051 A1 | 1/2014 | Lu et al. |
| 2014/0020184 A1 | 1/2014 | Loth |
| 2014/0047546 A1 | 2/2014 | Sidagni |
| 2014/0181517 A1 | 6/2014 | Alaranta et al. |
| 2014/0181520 A1 | 6/2014 | Wendling et al. |
| 2014/0188796 A1 | 7/2014 | Fushman et al. |
| 2014/0189863 A1 | 7/2014 | Rorabaugh et al. |
| 2014/0201841 A1 | 7/2014 | Deshpande et al. |
| 2014/0208405 A1 | 7/2014 | Hashai |
| 2014/0235230 A1 | 8/2014 | Raleigh |
| 2014/0237236 A1 | 8/2014 | Kalinichenko et al. |
| 2014/0244993 A1 | 8/2014 | Chew |
| 2014/0245278 A1 | 8/2014 | Zellen |
| 2014/0245396 A1 | 8/2014 | Oberheide et al. |
| 2014/0247140 A1 | 9/2014 | Proud |
| 2014/0297840 A1 | 10/2014 | Qureshi |
| 2014/0310415 A1 | 10/2014 | Kirner et al. |
| 2014/0351954 A1 | 11/2014 | Brownell et al. |
| 2014/0376543 A1 | 12/2014 | Malatack et al. |
| 2015/0002646 A1 | 1/2015 | Namii |
| 2015/0012914 A1 | 1/2015 | Klein et al. |
| 2015/0026461 A1 | 1/2015 | Devi |
| 2015/0040194 A1 | 2/2015 | Chaskar et al. |
| 2015/0058983 A1 | 2/2015 | Zeitlin et al. |
| 2015/0213259 A1 | 7/2015 | Du et al. |
| 2015/0213268 A1 | 7/2015 | Nance et al. |
| 2015/0237026 A1 | 8/2015 | Kumar |
| 2015/0242643 A1 | 8/2015 | Hankins et al. |
| 2015/0261955 A1 | 9/2015 | Huang et al. |
| 2015/0281318 A1 | 10/2015 | Warner et al. |
| 2015/0304351 A1 | 10/2015 | Oberheide et al. |
| 2015/0312233 A1 | 10/2015 | Graham et al. |
| 2016/0005696 A1 | 1/2016 | Tomohiro |
| 2016/0018007 A1 | 1/2016 | Eckholz |
| 2016/0021117 A1 | 1/2016 | Harmon et al. |
| 2016/0028639 A1 | 1/2016 | Wong et al. |
| 2016/0056962 A1 | 2/2016 | Mehtala |
| 2016/0080366 A1 | 3/2016 | Agarwal |
| 2016/0164866 A1 | 6/2016 | Oberheide et al. |
| 2016/0180072 A1 | 6/2016 | Ligatti et al. |
| 2016/0180343 A1 | 6/2016 | Poon et al. |
| 2016/0212129 A1 | 7/2016 | Johnston et al. |
| 2016/0286391 A1 | 9/2016 | Khan |
| 2016/0300231 A1 | 10/2016 | Shavell et al. |
| 2016/0314301 A1 | 10/2016 | Johns et al. |
| 2016/0366589 A1 | 12/2016 | Jean |
| 2017/0039242 A1 | 2/2017 | Milton et al. |
| 2017/0046519 A1* | 2/2017 | Cam .................... G06F 21/577 |
| 2017/0169066 A1 | 6/2017 | Mantri et al. |

OTHER PUBLICATIONS

Neuenhofen, Kay, and Mathew Thompson. "A secure marketplace for mobile java agents." Proceeding of the second international Conference on Autonomous agents. ACM, 1998. (pp. 212-218).

Simske et al., "APEX: Automated Policy Enforcement eXchange", Sep. 21-24, 2010, ACM, pp. 139-142.

Symantec, Administration Guide for Symantec TM Endpoint Protection and Symantec Network Access Control, Aug. 1, 2007.

Symantec, Administration guide for symantec Endpoint protection

(56) References Cited

OTHER PUBLICATIONS and symantec network access control, 2009, version 11.00.05.00.00.
"Aloul S Zahidi; et al. "Two factor authentication using mobile phones," 2009 IEEE/ACS International Conference on Computer Systems and Applications, Rabat, 2009, pp. 641-644.", Feb. 6, 2018 00:00:00.0.
"Bonneau Joseph; et al. "Passwords and the evolution of imperfect authentication." Communications of the ACM 58.7 (2015): 78-87.", Feb. 6, 2018 00:00:00.0.
"Goldfeder et al., Securing Bitcoin wallets via a new DSA/ECDSA threshold signature scheme, http://www.cs.princeton.edu/~stevenag/threshold_sigs.pdf".
"Kher Vishal; et al. "Securing distributed storage: challenges, techniques and systems." Proceedings of the 2005 ACM workshop on Storage security and survivability. ACM, 2005, pp. 9-25.", Feb. 6, 2018 00:00:00.0.
Stone-Gross Brett; et al. "Peering Through the iFrame", INFOCOM Proceeding, IEEE, Apr. 10-15, 2011, pp. 111-415.
Yao, Qiong, et al.,"Effective Iframe-based Strategy for Processing Dynamic Data in Embedded Browser", International Conference on Advanced Computer Theory and Engineering (ICACTE), IEEE, Dec. 20-22, 2008, pp. 538-542.

\* cited by examiner

SYSTEM AND METHOD FOR ASSESSING VULNERABILITY OF A MOBILE DEVICE

CROSS-REFERENCE TO RELATED APPLICATIONS

This application is a continuation of U.S. patent application Ser. No. 13/601,409, filed 31 Aug. 2012, which claims the benefit of U.S. Provisional Application No. 61/530,560, filed 2 Sep. 2011, and titled SYSTEM AND METHOD OF CLOUD-ASSISTED VULNERABILITY ASSESSMENT OF MOBILE DEVICES, both applications are incorporated by reference herein in their entireties.

STATEMENT OF FEDERALLY SPONSORED RESEARCH AND DEVELOPMENT

This invention was made with government support under DARPA-RA-11-52 Cyber Fast Track awarded by the Defense Advanced Research Projects Agency. The government has certain rights in the invention.

TECHNICAL FIELD

This invention relates generally to the mobile security field, and more specifically to a new and useful system and method for assessing vulnerability of a mobile device in the mobile security field.

BACKGROUND

As mobile devices become increasingly ubiquitous, users are beginning to store sensitive information, perform financial transactions, and take other actions that are normally done on non-mobile computing platforms. This type of activity makes mobile devices an attractive target to malicious parties who may wish to compromise the security of a user's mobile device to steal data, snoop on a user's communication, or perform some other type of fraudulent actions. Therefore, the security of the mobile device (including both its hardware and software platform) is becoming increasingly important. Traditional approaches to mobile device software security often involve adopting the antivirus from non-mobile computing platforms, where installed applications and files are scanned locally on the device using signatures and heuristics to determine whether malicious applications or files may be present. However, the environment of mobile devices is where devices are less powerful have limited battery lives. Additionally, user behavior on mobile devices is different where users frequently install new applications. The number of malicious apps is unlimited, and thus, attempting to detect and prevent malicious code is unreasonable for the mobile hardware/software environment. Thus, there is a need in the mobile security field to create a new and useful system and method for assessing vulnerability of a mobile device. This invention provides such a new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The system and method for assessing vulnerability of a mobile device of the preferred embodiments employ an analysis cloud service to provide vulnerability assessment to mobile devices. The system and method primarily function to identify software components or files on a mobile computing device that contain vulnerabilities that may be leveraged by malicious parties to attack the mobile device or software of the mobile device. While the approaches of some mobile security solutions simply attempt to identify malicious software on the mobile device, the system of the preferred embodiment can securely and in a scalable manner identify components that may be leveraged by malicious entities. A vulnerability assessment can preferably identify vulnerabilities in legitimate software that may be exploited by malicious applications or attackers, as opposed to just identifying existing malicious applications installed on the mobile device as traditional mobile security software does. On many mobile devices, there are often app ecosystems that promote the installation of numerous applications. The system and method preferably uses the distributed vulnerability assessments to target a bounded number of security issues as opposed to combating a constantly evolving and growing number of malicious code. Additionally, the analysis cloud service can facilitate the heavyweight processing that some vulnerability assessment techniques may require, which can alleviate mobile devices from these processing tasks. Vulnerability assessment also facilitates identifying security fixes in the mobile computing landscape which has numerous stake holders including maintainers of mobile OS's, device firmware developers, carriers configuring device and various developers for libraries and applications. The system and method of a preferred embodiment is preferably employed for mobile devices. Here mobile devices may include mobile phones, tablet computers, gaming devices, TV-computer devices, GPS devices, or any suitable computing device.

A System for Assessing Vulnerability of a Mobile Device

Figure 1:
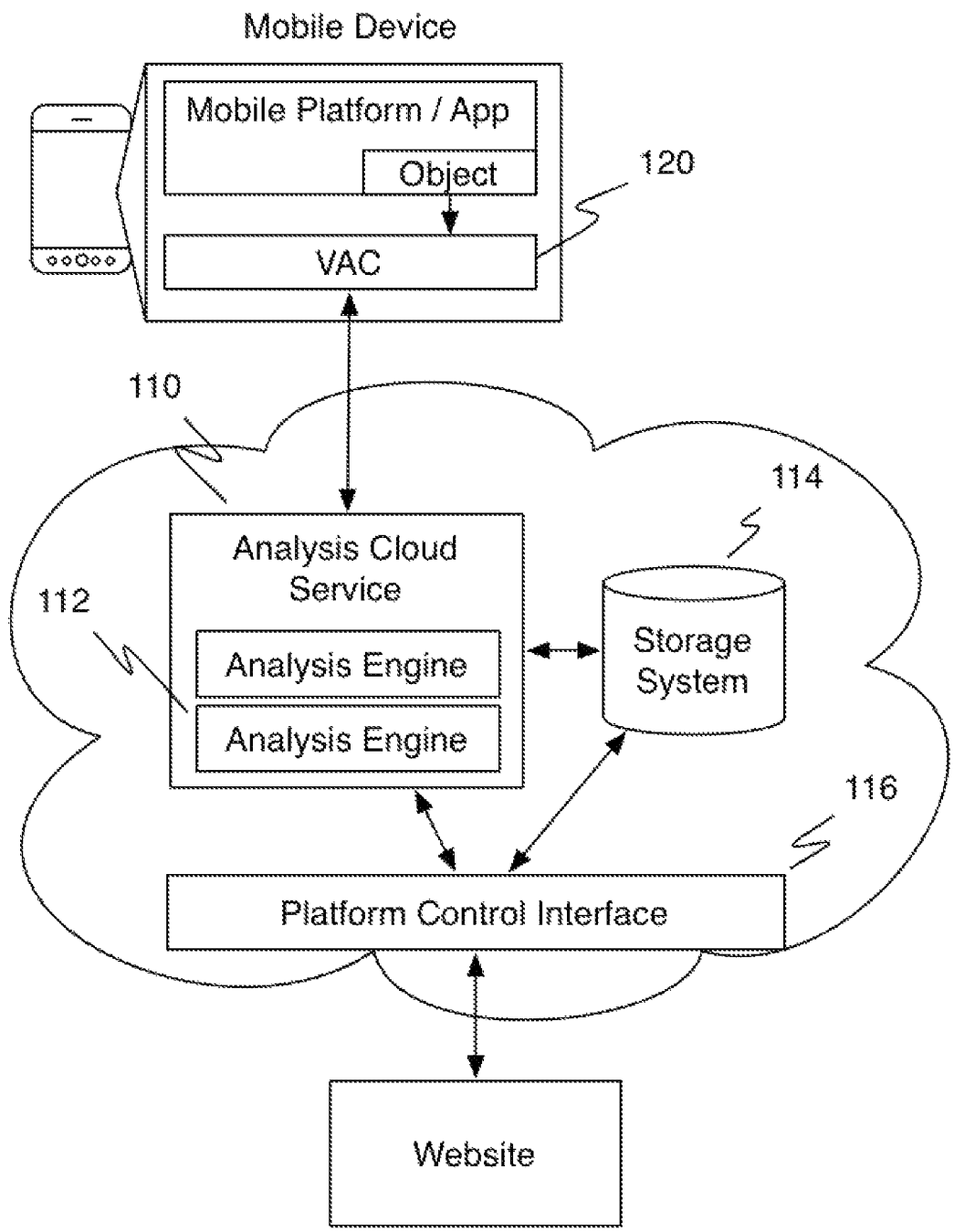
FIG. 1 is a schematic representation of a system of a first preferred embodiment of the invention.
Figure 2:
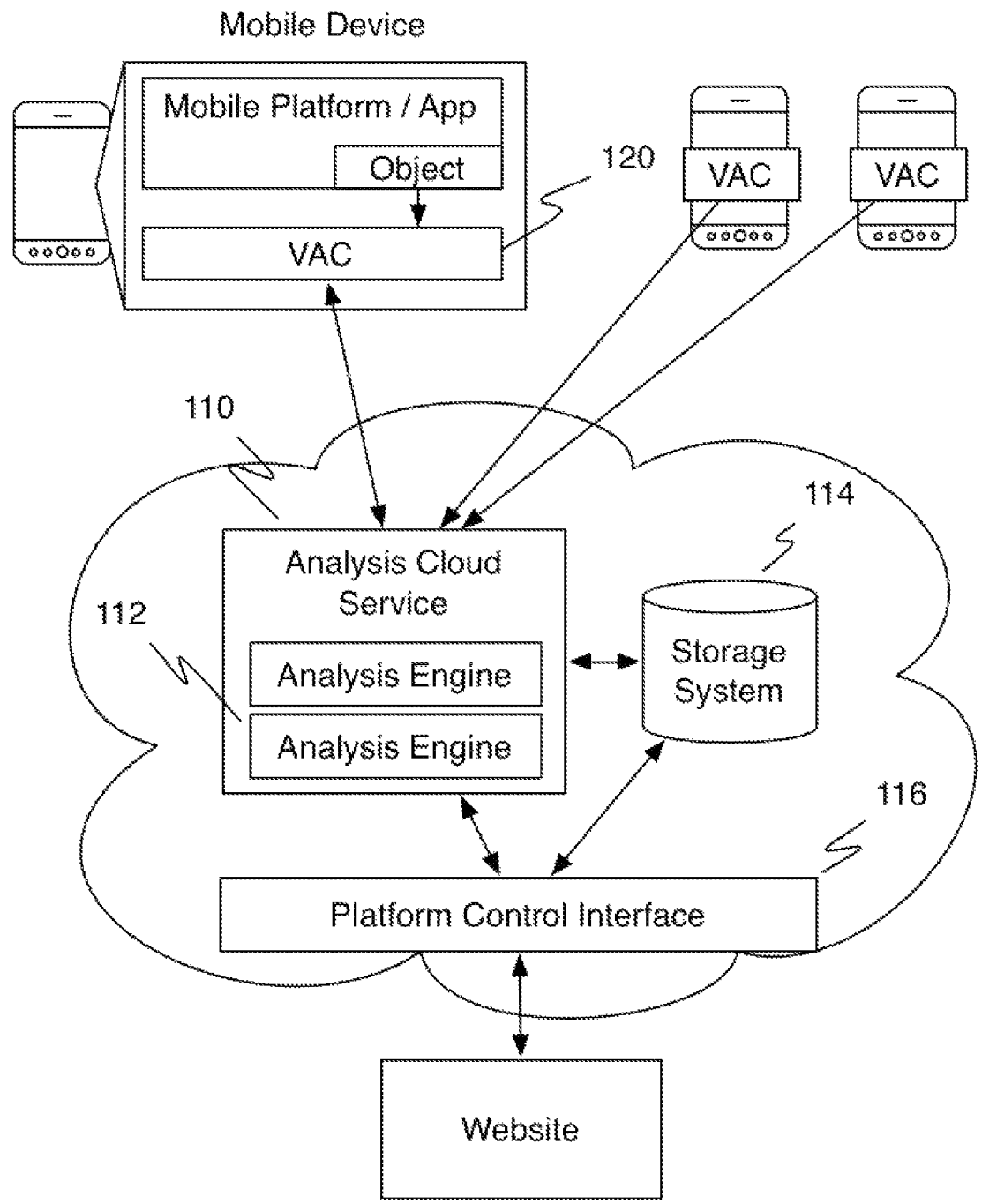
FIG. 2 is a schematic representation depicting a multi-tenant application of a system of a first preferred embodiment of the invention.

As shown in FIG. 1, a system for assessing vulnerability of a mobile device of a preferred embodiment includes an analysis cloud service 110 and a Vulnerability Assessment Component (VAC) of a mobile computing device 120. The analysis cloud service may additionally include cloud-based storage system 1114 and a platform control interface 1116. As described above the system of the preferred embodiment functions to identify software components or files on a mobile computing device that contain vulnerabilities that may be leveraged by malicious parties to attack the mobile device or software of the mobile device. The system is preferably configured such that the analysis cloud service may provide vulnerability assessment to a large number of mobile computing devices as shown in FIG. 2. As exemplary applications, this system may be deployed for use on carrier devices or within a collection of devices managed by a corporate IT department. The use of an analysis cloud service to facilitate vulnerability assessment additionally preferably enables the system to be used by a wide variety of devices. Updates can preferably be easily and quickly made to the analysis cloud service, and mobile devices utilizing a VAC can instantly benefit from up-to-date vulnerability information.

The analysis cloud service 110 of the preferred embodiment functions to remotely analyze and assess the vulnerability of a plurality of mobile devices that utilize the service. The analysis cloud service 110 is preferably a network-based service. The analysis cloud service 110 is preferably a software component running on a server that is accessible to the mobile device via the network. Such a network may be public or private in nature, and the analysis cloud service 110 may communicate with the VAC using any variety of protocols using any type of network interface deemed appropriate. The analysis cloud service 110 is preferably configured to scale within a cloud computing environment to meet large volumes of vulnerability requests. The analysis cloud service 110 is tasked with receiving vulnerability assessment requests from a VAC, using the information in the request to identify vulnerabilities using one of its analysis engines 112, and returning the result back to the VAC over the network or through any suitable means. The analysis cloud service may additionally include a vulnerability storage system 114 to facilitate the detection and analysis of vulnerability in a plurality of devices. In another alternative embodiment, the analysis cloud service may be communicatively coupled with a platform control interface 116 that can provide vulnerability assessment response control or informational statistics.

The analysis engine 112 of the analysis cloud service 110 of a preferred embodiment functions to process and assess whether a vulnerability is present in an operable object on a mobile device. The analysis engine 112 may implement any number of algorithms or heuristics to perform a vulnerability assessment. For known vulnerabilities, the analysis engine 112 may have certain patterns it can identify in an operable object to determine whether the vulnerability is present. As most vulnerabilities present themselves in software code, the analysis engine may disassemble an operable object and analyze underlying machine code to determine whether a vulnerability is present or not. For unknown vulnerabilities, the analysis engine 112 may employ heuristics to identify more general weaknesses that may be representative of a class of vulnerabilities, rather than attempting to identify a specific vulnerability. Any number of analysis engines 112 or routines may be present in the analysis cloud service 110. As an example, the analysis engine 112 may include algorithms and heuristics to identify privilege escalation vulnerabilities such as bugs allowing a device to be rooted (e.g., ASHMEM vulnerability), neglecting to check if messages are from a trusted source (e.g., Exploid or Gingerbreak vulnerability), privilege levitating (e.g., Levitator vulnerability), writing to arbitrary memory address space (e.g., Mempodroid vulnerability), overwhelming a system with command arguments (e.g., Android ZergRush vulnerability), neglecting to check return values enabling root shells (e.g., Zimperlich vulnerability), and/or any suitable vulnerability or exploits.

The vulnerability storage system 114 of a preferred embodiment functions to store vulnerability assessment results and any related metadata. The vulnerability storage system 114 is preferably communicatively coupled to the analysis cloud service 110. Data of the vulnerability storage system 114 may additionally be indexed by cryptographic hashes or signatures of operable objects or identifiers. This functions to enable vulnerability assessments to be cached and quickly delivered to a mobile device while avoiding reprocessing similar or duplicate operable objects. This has unique benefits for a multitenant analysis cloud service 110, and can result in considerable processing savings. The vulnerability storage system 114 may additionally store data that may be used by the platform control interface 116 to provide statistical data for one or more mobile devices.

The platform control interface 116 of a preferred embodiment functions to provide a control interface for global management over at least a subset of the mobile devices using the analysis cloud service 110. The platform control interface 116 in one variation provides statistical and infographic reports based on the vulnerability assessment of a plurality of devices. For example, a company could see the vulnerability assessment for all devices used by employees. An IT department of the company would then be empowered to make decisions about how to update their mobile IT infrastructure to ensure the mobile security of their employees. Additionally or alternatively, the platform control interface 116 may be used to control devices. The platform control interface 116 may additionally or alternatively provide functionality for a user to initiate pushing patches or any suitable device updates to a mobile device or devices.

The vulnerability assessment component (VAC) 120 of a preferred embodiment functions to facilitate communicating required information from a mobile device to the analysis cloud service 110. The VAC 120 is preferably a software agent installed on a mobile device that collects software objects to be assessed and transmits vulnerability assessment requests to the analysis cloud service 110. The VAC 120 additionally can receive the vulnerability assessments and depending on the application present the vulnerability assessment result to a user, provide the assessment to an application, automatically initiate patching a vulnerability, or take any suitable action. As many vulnerability assessment techniques may be computationally heavyweight, the VAC 120 preferably off-loads these tasks to the analysis cloud service 110. The VAC 120 may be built into the mobile software platform itself, installed as a third-party app by the user of the mobile device, or delivered via any other mechanism available to execute software on the mobile device.

The VAC 120 preferably compiles information about operable objects on the mobile device. An operable object is preferably an entity upon which the vulnerability assessment is being performed. The operable object is a software entity, which can include a system component, a mobile application, a data file, or any other logical or physical collection of data. Vulnerabilities are typically present in software code, so in most cases the operable object would be some executable code used by the mobile software platform that is suspected to have a known or unknown vulnerability present. The information on the operable object is preferably compiled into an object identifier. The object identifier is preferably a direct identifier such as copy of the code or segment of code from the operable object, but the object identifier may be file or executable name, a version number or ID, a configuration file, a hash or signature generated from the operable object, any alternative references to the data object, or any suitable data that may be used to identify the operable object.

A Method for Assess Vulnerability of a Mobile Device

Figure 3:
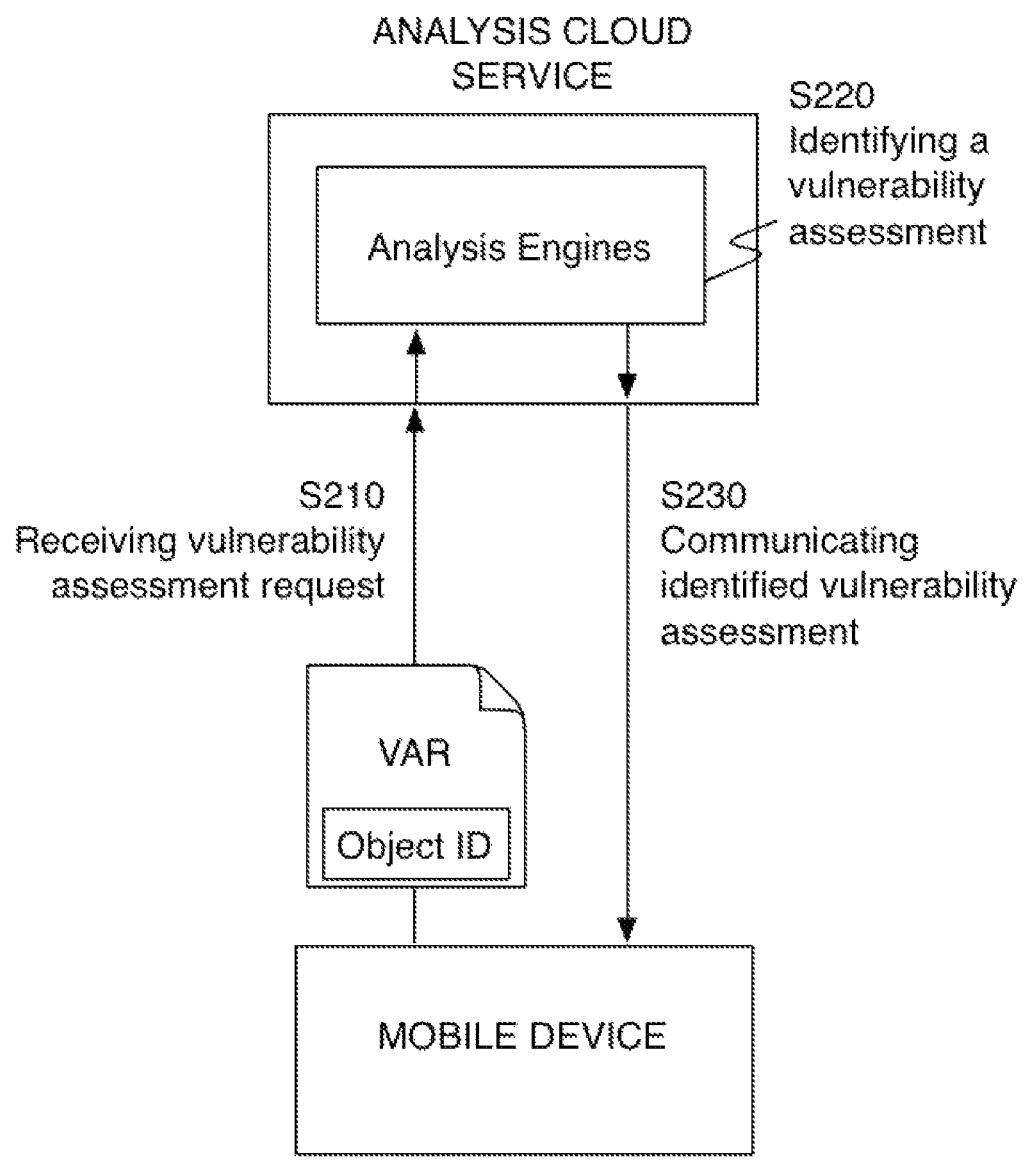
FIGS. 3-4 are schematic representations of methods of preferred embodiments of the invention.

As shown in FIG. 3, method for assessing vulnerability of a mobile device of preferred embodiment includes at a remote analysis cloud service, receiving at least one vulnerability assessment request that includes an object identifier for an operative object of a mobile computing device block S210; identifying a vulnerability assessment associated with the identifier of the operative object block S220; and communicating the identified vulnerability assessment to the mobile computing device block S230. As described above, the method of a preferred embodiment functions to identify software components or files on a mobile computing device that may contain vulnerabilities that can be leveraged by malicious parties to attack the mobile device or software of the mobile device. Preferably, the method is additionally adapted for implementing vulnerability assessment for a plurality of mobile devices. In this alternative embodiment, a plurality of vulnerability assessment requests are received at the analysis cloud service, and correspondingly, vulnerability assessments may be identified and communicated to the associated mobile devices. This multitenant alternative preferably includes storing identified vulnerability assessments in a cloud based storage system as described below.

Block S210, which includes at a remote analysis cloud service, receiving at least one vulnerability assessment request that includes an object identifier for an operative object of a mobile computing device, functions to obtain the data needed to perform a vulnerability assessment on behalf of a mobile device. The vulnerability assessment request originates from a mobile computing device and received over a network. The network communication may use any suitable network interface protocol. Vulnerability requests may be received from a plurality of devices. A vulnerability assessment request preferably includes at least one object identifier for an operative software object of a mobile computing device. The object identifier is preferably a copy or segment of code from the software of the operable object. The object identifier may alternatively be an application identifier or version number, data name, a version number or ID, a configuration file, the code or segment of code from the operable object, a hash or signature generated from the operable object, or any suitable data that may be used to identify the operable object.

Block S220, which includes identifying a vulnerability assessment associated with the identifier of the operative object, functions to determine if a potential vulnerability or weakness is present in an operable object of a mobile device. An analysis engine or any suitable component of the analysis cloud service preferably performs the processing on the object identifier. Preferably, identifying a vulnerability includes disassembling the executable code into native machine code and detecting unpatched vulnerabilities. For example, a file such as the volume manager file may be disassembled into its native machine code and analyzed to determine whether a known vulnerability, such as the gingerbreak vulnerability for Android devices, has been patched. Code analysis routines can preferably be developed and deployed to the analysis cloud service at any suitable time, which enables the analysis cloud service to provide current vulnerability assessment to all devices at the time of their vulnerability assessment. Alternatively or additionally, identifying a vulnerability may include querying a map of object identifiers to vulnerability assessments. For example, the version number of software may have been included as the object identifier, and that object identifier may be used to look up a known vulnerability assessment. More preferably, a cryptographic hash of a code segment may be used to query a storage system for an assessment previously calculated for the code segment. The analysis cloud service preferably includes a combination of approaches to identify a vulnerability.

Block S230, which includes communicating the identified vulnerability assessment to the mobile computing device, functions to return the analysis result and any other relevant metadata from the cloud service back to the mobile device over the network. If a vulnerability is identified, a parameter is preferably set in the response to the mobile device to indicate the vulnerability. Additional vulnerability information or data may additionally or alternatively be compiled, such as the appropriate patch or executable code to run on the machine to fix the executable, a link to an online resource to find an appropriate patch, contact information for the entity responsible for patching the vulnerability, or any suitable information about the vulnerability. In some variations, the analysis cloud service may send a response to the vulnerability assessment request that requests a second object identifier from the VAC. For example, in an initial request, the VAC may transmit an object identifier only including the version number. If this version number is determined by the analysis cloud service to be insufficient to determine the vulnerability status of the device, the VAC may be asked to transmit a code segment as the object identifier.

Figure 4:
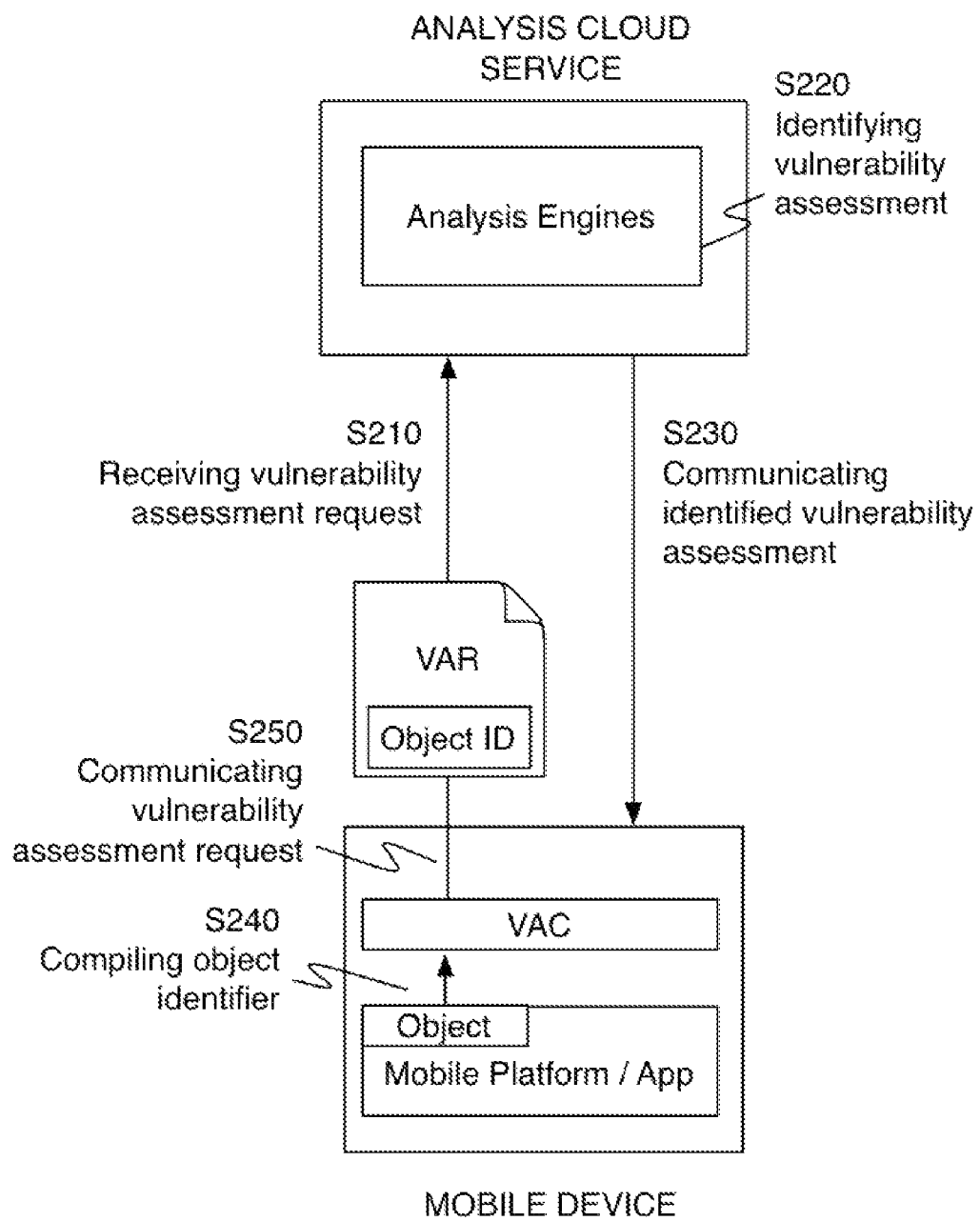

Additionally, the method of the preferred embodiment may include at a vulnerability assessment component (VAC) operable on the mobile device, compiling at least one object identifier for the vulnerability assessment request block S240; and communicating the vulnerability assessment request to the analysis cloud service block S250 as shown in FIG. 4. Blocks S240 and S250 function to collect information needed to assess vulnerability of a mobile device and transmit the information from the mobile device to the analysis cloud service. The VAC is preferably substantially similar to the VAC described above. The VAC may be an application, a component integrated and used by an application, a component used by an OS, or any suitable object operable on the mobile device. The vulnerability assessment request transmitted from the VAC preferably corresponds to the vulnerability assessment request received at the analysis cloud service. Thus, blocks S240 and S250 are preferably performed prior to the analysis cloud service receiving the vulnerability assessment request.

A vulnerability assessment process is preferably initiated on the mobile device by a user, but a vulnerability assessment process may be scheduled, automatically initiated, initiated through an API, initiated by the analysis cloud service, or initiated in any suitable manner. In one variation, the VAC may trigger a vulnerability assessment request without requiring the user to request it. For example, the analysis cloud service or a third-party service may communicate with the VAC on the mobile device to initiate a vulnerability assessment without any user interaction on the mobile device.

The VAC may seek out and collect an operable object from the software that makes up the mobile platform and applications and prepare the object for transmission to the analysis cloud system. For example, an executable file that implements a system service of the mobile platform that is suspected to be vulnerable to a known exploit can be collected by the VAC. The aforementioned file may be transmitted in the request to the analysis cloud service along with other identifying details or metadata about the device, file, or request. As described, the object identifier may include a portion of executable code. In a variation of the embodiment described above, the VAC may send an alternate or compact form of the operable object to be analyzed by the CS. For example, this alternate form could be a summary, cryptographic hash, version number, or other identifier that results in a more efficient transmission of the object identifier to the analysis cloud service instead of transmitting the full operable object. The analysis cloud service may use this compact representation to avoid unnecessary or duplicate analysis. For example, a cryptographic hash of an operable object may be sent to the analysis cloud service by the VAC; the VAC can check whether that operable object has already been analyzed by looking up the hash in a vulnerability storage system; if the object has been analyzed, the result can be immediately returned; if not, the analysis cloud service can request that the VAC send the full Object and perform its usual analysis routines on the Object. In one variation, a plurality of object identifiers are included in a vulnerability assessment request. The plurality of object identifiers may include executable code segments, device identifiers, and software version identifiers, and/or any suitable identifiers.

A vulnerability assessment request may be for a single vulnerability check but may alternatively be for multiple vulnerability checks. For example, communicating the vulnerability assessment request may include multiplexing a plurality of vulnerability assessment requests into a single communication to the remote analysis cloud service; and wherein receiving at least one vulnerability assessment request at the analysis cloud service includes demultiplexing a vulnerability assessment request into a plurality of vulnerability assessment requests. This batched transmission functions for more efficient use of the mobile device's network radio. While at least one of the assessment request includes an object identifier for which a vulnerability assessment is required, extraneous, faked, or otherwise superfluous vulnerability assessment requests may be made. The superfluous requests function to misdirect any attempts to reverse engineer the vulnerability assessment process by a malicious party.

Figure 5:
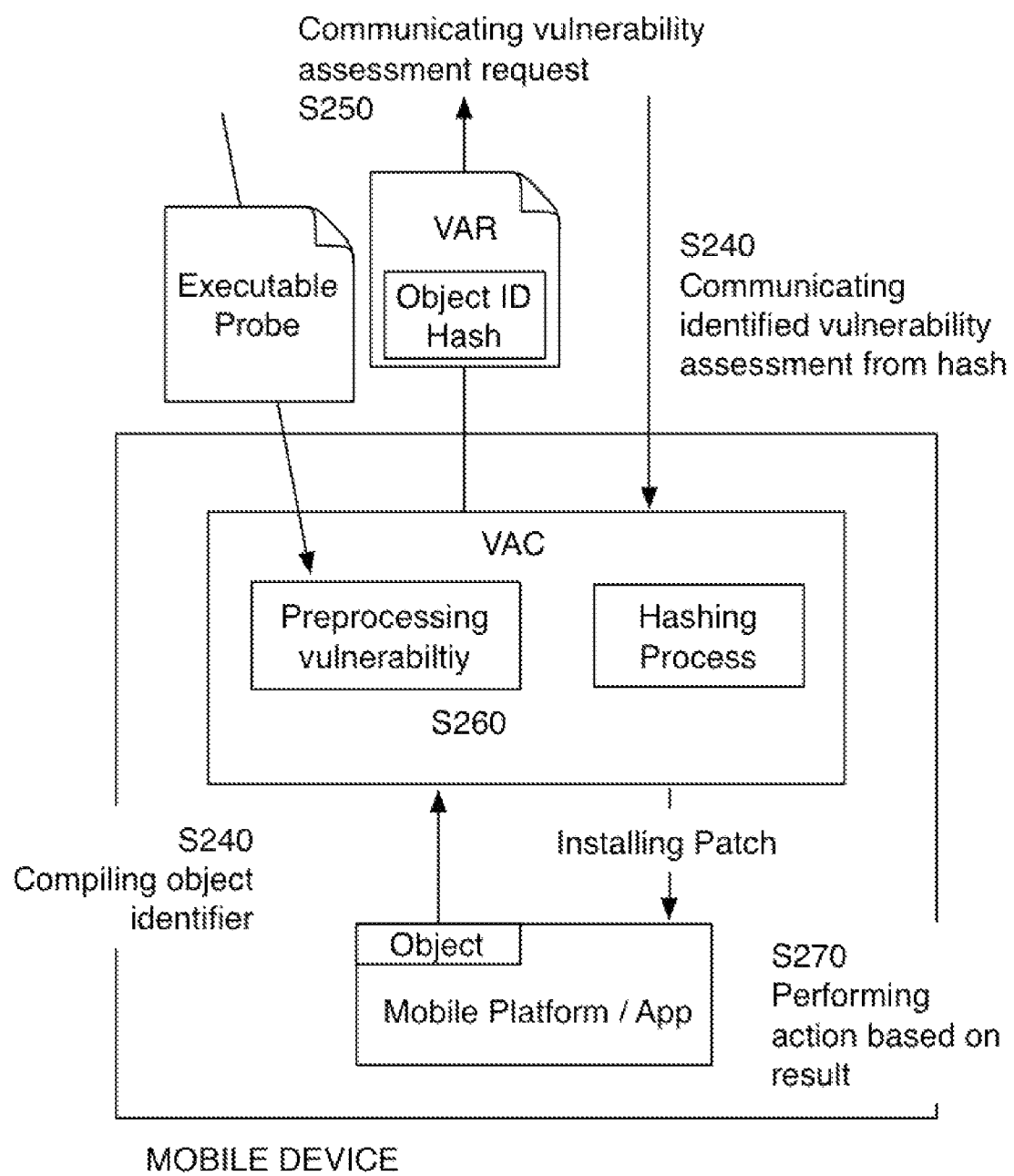
FIG. 5 is a detailed schematic representation of alternative variations of a Vulnerability Assessment Component of a preferred embodiment of the invention.

Alternatively or additionally, a method of a preferred embodiment may include at the VAC, performing at least a partial vulnerability assessment prior to communicating the vulnerability assessment request to the cloud service S260 as shown in FIG. 5. Certain analysis routines may be performed on the mobile device by the VAC instead of being performed on the analysis cloud service. These analysis routines may be bundled with the VAC initially, updated periodically from the analysis cloud service, or pushed down from the analysis cloud service to the VAC at the time a vulnerability assessment is requested or triggered. Preferably, the VAC will initially contact the analysis cloud service, and the analysis cloud service will return an executable probe to the VAC. The executable probe is preferably a script, application, and/or file facilitating an at least partial vulnerability assessment performed on the mobile device. The executable probe may identify the presence of a vulnerability or alternatively collect information indicative of a vulnerability that may be subsequently used by the analysis cloud service. The result of the test of the executable probe is preferably communicated to the analysis cloud service as an object identifier of a vulnerability assessment request. Similarly, a cache of object identifiers or hashes of object identifiers may be stored locally on the device, and vulnerability assessments may initially be checked on the mobile device before sending a vulnerability request to the analysis cloud service.

Additionally, a method of a preferred embodiment may include performing some action based on the result of the analysis that was submitted block S270 as shown in FIG. 5. Such an action may include notifying the user of a potential vulnerability, giving the user additional information on the origin of the vulnerability and how it may be mitigated, notifying a third-party service about the presence of the vulnerability on the user's mobile platform, or even automatically patching the vulnerability or taking further action that may limit the risk of the vulnerability's presence. For example, a banking application may want to ensure that the mobile device is not vulnerable to particular attacks during particular transactions. The method for assessing vulnerability of a mobile device may be performed and the resulting vulnerability assessment may be appended to a transaction as a qualifier for the transaction. When automatically patching a vulnerability, a vulnerability patch is preferably included or referenced in the vulnerability assessment response from the analysis cloud service. The vulnerability patch may be automatically installed or may alternatively require user interaction to complete installation of the vulnerability patch.

Figure 6:
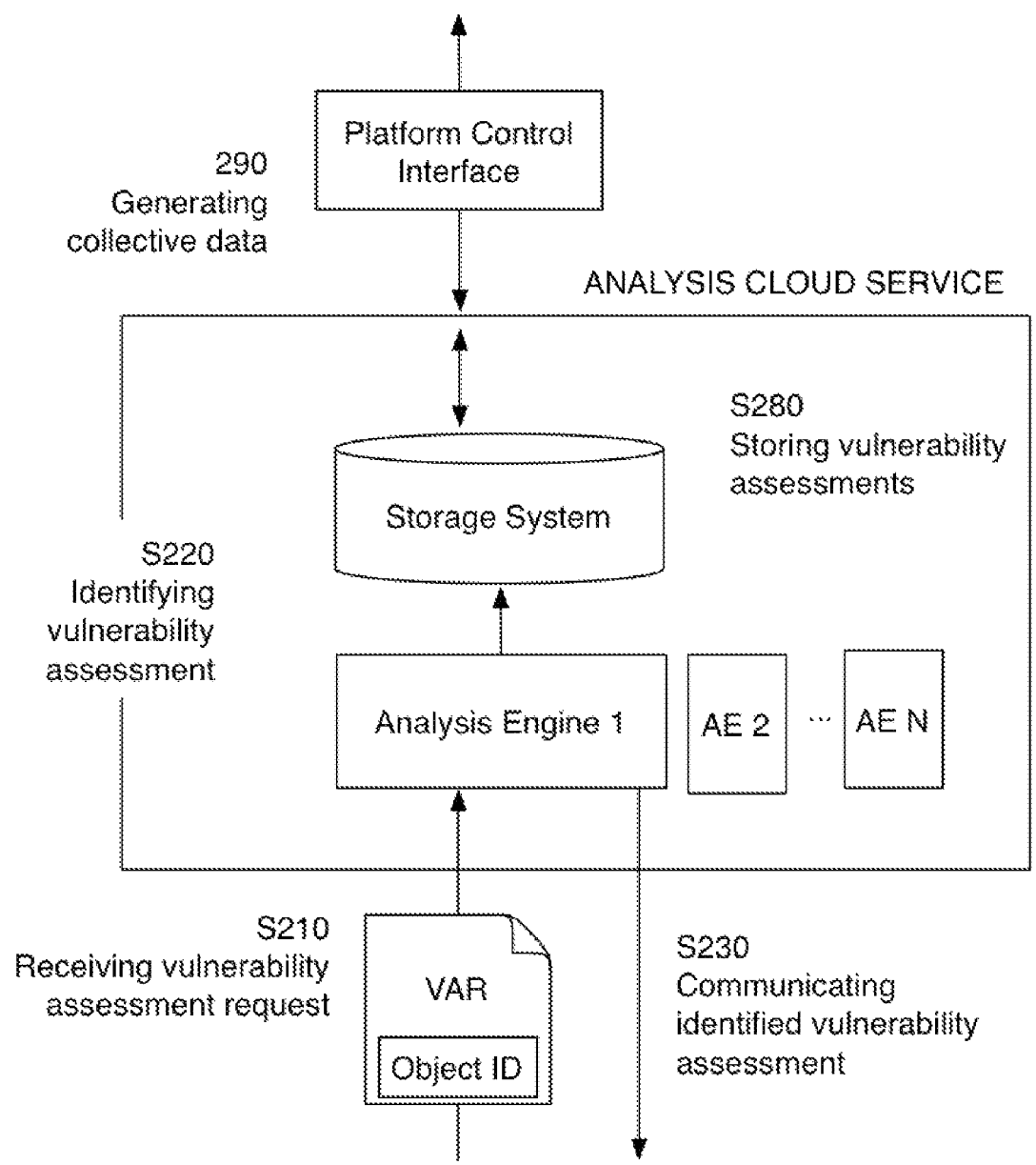
FIG. 6 is a detailed schematic representation of alternative variations of a analysis cloud service of a preferred embodiment of the invention.

Additionally, a method of a preferred embodiment may include the use of a vulnerability storage system to facilitate vulnerability identification. The vulnerability storage system is preferably a database, but may alternatively be a memory cache or any suitable storage system. Preferably, a cloud based storage system stores identified vulnerability assessments according to the associated object identifier block S280 as shown in FIG. 6. The cloud based storage system may be a component of the analysis cloud service, but may alternatively be any suitable storage component. A cryptographic hash of the vulnerability assessment or other sufficiently unique identifier may be used to lookup and store the results in the cache. The vulnerability storage system can preferably be used as a cache to avoid performing unnecessary duplicate analysis for various operable objects that have been previously submitted and analyzed. For example, a VAC may submit a code segment of an operable object from Alice's device for analysis, which the analysis cloud service will analyze and store the result in the vulnerability storage system. If a VAC on Bob's mobile device submits an identical code segment later, the CS can avoid re-running a potentially expensive analysis and simply lookup the existing result and return it immediately. In an alternative variation of the above example, a VAC of Alice's device calculates a cryptographic hash of the code segment. This hash is initially sent to the analysis cloud service. Assuming this code segment has never been analyzed, the analysis cloud service sends a response requesting the code segment. Alice's VAC then transmits the code segment as the object identifier. The analysis cloud service will analyze and store the result in the vulnerability storage system using the hash as a key. On Bob's mobile device, the VAC also generates a hash of the code segment and initially transmits the hash to the analysis cloud service. In this example, the code segments (and thus the hashes) of Alice and Bob are identical. The analysis cloud service uses the hash to find the results calculated from Alice's vulnerability assessment. These results are sent to Bob's device. Analysis of the code segment from Bob was never processed directly because the result had been collected from another device.

In a variation of the embodiment described above, the VAC can authenticate itself to the CS in order to verify the identity of the mobile devices sending requests and also uniquely identify those devices for statistical trending, inventory, or other tracking purposes. The VAC may be seeded with some unique identifiers (IMEI, IMSI, hardware IDs, etc) and keys with which to cryptographically sign requests (eg. HMAC-SHA1, RSA, etc) to the CS.

Additionally, a method of a preferred embodiment may include at a platform control interface communicatively coupled to the analysis cloud service, compiling a mapping of identified vulnerability and associated object identifiers stored in the cloud based storage system and generating collective vulnerability data for the plurality of mobile computing devices block S290 as shown in FIG. 6. The vulnerability data preferably provides insight into overall statistics of mobile devices that use the analysis cloud service. This vulnerability data may additionally be segmented according to particular devices. For example, a company with employee issued phones may be able to view data on the vulnerability of all employee-issued phones in a single interface. The platform control interface may additionally be used for device management. At the platform control interface, the method may include pushing a vulnerability fix to the at least one mobile device in response to generated collective vulnerability data, collecting vulnerability assessments from one or more mobile devices, or remotely initiating any suitable action within the vulnerability assessment system.

An alternative embodiment preferably implements the above methods in a computer-readable medium storing computer-readable instructions. The instructions are preferably executed by computer-executable components preferably integrated with an analysis cloud service and/or a Vulnerability Assessment Component. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for assessing vulnerability associated with a computing device comprising:
    receiving a vulnerability assessment request;
    in response to receiving the vulnerability assessment request, performing at a remote cloud service a vulnerability assessment of an operative object of a computing device, wherein the operative object includes executable code and is operable on the computing device, wherein the vulnerability assessment request includes an object identifier of the operative object, and wherein the object identifier includes a subset of executable code from the operative object; and
    identifying the vulnerability assessment of the operative object associated with the object identifier, comprising:
        disassembling the subset of executable code of the object identifier into native machine code, and
        detecting unpatched vulnerabilities in the native machine code.

2. The method of claim 1, wherein the vulnerability assessment request further includes at least one additional superfluous or extraneous object identifier.

3. The method of claim 2, wherein:
    the computing device is a mobile computing device remotely located from the remote cloud service,
    the vulnerability assessment request originates from the mobile computing device,
    the operative object is operable on the mobile computing device, and
    wherein the method further comprises communicating, from the remote cloud service to the mobile computing device, the vulnerability assessment of the operative object associated with the object identifier.

4. The method of claim 1, further comprising:
    receiving at least one additional superfluous vulnerability assessment request.

5. The method of claim 1, further comprising:
    compiling, using a vulnerability assessment component (VAC), at least one object identifier for the vulnerability assessment request.

6. The method of claim 5, wherein compiling the at least one object identifier for the vulnerability assessment request includes compiling at least one additional superfluous object identifier.

7. The method of claim 6, further comprising the VAC initiating installation of a vulnerability patch to relevant vulnerabilities identified in the vulnerability assessment results.

8. The method of claim 5, wherein compiling the at least one object identifier for the vulnerability assessment request includes compiling at least one additional extraneous or faked object identifier.

9. The method of claim 5, further comprising:
    compiling at least one additional superfluous vulnerability assessment request.

10. The method of claim 5, wherein the at least one compiled object identifier is a plurality of object identifiers that includes an executable code segment, a device identifier, and component version identifier.

11. The method of claim 5, further comprises:
    communicating the identified vulnerability assessment to the computing device, wherein communicating the identified vulnerability assessment includes multiplexing a plurality of vulnerability assessment requests into a single communication to the remote cloud service; and
    receiving at least one vulnerability assessment request at the remote cloud service includes demultiplexing a vulnerability assessment request into a plurality of vulnerability assessment requests.

12. The method of claim 5, further comprising:
    at the VAC, receiving an executable probe; and
    performing at least a partial vulnerability assessment according to the executable probe prior to communicating the vulnerability assessment request to the cloud service.

13. The method of claim 12, wherein performing at least a partial vulnerability assessment includes checking a cache of vulnerability assessments.

14. The method of claim 5, wherein the VAC is a standalone application controlled by a user.

15. The method of claim 5, wherein the VAC is a component integrated into an application of the computing device; and further comprising communicating the identified vulnerability assessment from the VAC to the application of the computing device.

16. The method of claim 1, wherein detecting unpatched vulnerabilities includes detecting privilege escalation vulnerabilities.

17. A method for assessing vulnerability of a mobile device, comprising:
    receiving, at a remote cloud service, a plurality of vulnerability assessment requests, wherein a vulnerability assessment request includes at least one object identifier for an operative object of a mobile computing device, wherein the operative object includes executable code and is operable on the mobile computing device, and wherein the object identifier includes a subset of executable code from the operative object; and in response to receiving the plurality of vulnerability assessment requests, for each vulnerability assessment request of the plurality of vulnerability assessment requests,
performing, at the remote cloud service, a vulnerability assessment of the operative object of the vulnerability assessment request, and
identifying the vulnerability assessment associated with the object identifier of the operative object, comprising:
disassembling the subset of executable code of the object identifier into native machine code, and
detecting unpatched vulnerabilities in the native machine code.

18. The method of claim 17, further comprising in a cloud based storage system, storing identified vulnerability assessments according to the associated object identifier.

19. The method of claim 18, wherein storing identified vulnerability assessments are stored according to a hash of the associated object identifier.

20. The method of claim 19, further comprising:
at a vulnerability assessment component (VAC) and prior to receiving a vulnerability assessment request at the remote cloud service, compiling a hash of at least one object identifier for the vulnerability assessment request;
communicating a first vulnerability assessment request including the hash to the remote cloud service; and
wherein identifying vulnerability assessment includes querying the cloud based storage system for an identified vulnerability assessment associated with the hash.

21. The method of claim 18, further comprising at a platform control interface, compiling a mapping of identified vulnerability and associated object identifiers stored in the cloud based storage system and generating collective vulnerability data for the plurality of mobile computing devices.

22. The method of claim 21, further comprising at the platform control interface, pushing a vulnerability repair to the mobile computing device in response to generated collective vulnerability data.

23. The method of claim 17, further comprising:
at a vulnerability assessment component (VAC) and prior to receiving a vulnerability assessment request at the remote cloud service, compiling at least one object identifier for the vulnerability assessment request and compiling at least one additional superfluous object identifier, wherein the superfluous object identifier is different from the at least one object identifier;
and communicating the vulnerability assessment request to the remote cloud service.

24. A method for assessing vulnerability associated with a computing device comprising:
receiving one or more vulnerability assessment requests;
performing, at a remote cloud service, a vulnerability assessment of an operative object of a computing device based on the one or more vulnerability assessment requests, wherein the operative object includes executable code and is operable on the computing device, and wherein the one or more vulnerability assessment requests include:
1) an object identifier of the operative object and a superfluous object identifier, the superfluous object identifier being different than the object identifier, or
2) an object identifier of the operative object and a superfluous vulnerability assessment request,
wherein the object identifier of the operative object includes a subset of executable code from the operative object;
determining the vulnerability assessment of the operative object associated with the object identifier, comprising:
disassembling the subset of executable code of the object identifier into native machine code, and
detecting unpatched vulnerabilities in the native machine code; and
communicating the determined vulnerability assessment.

* * * * *